United States Patent
Murasawa et al.

(10) Patent No.: US 7,030,287 B2
(45) Date of Patent: Apr. 18, 2006

(54) METHOD OF DECREASING NITRATE NITROGEN AND VOLATILE ORGANIC COMPOUND IN SOIL AND GROUNDWATER

(75) Inventors: Koichiro Murasawa, Kawanishi (JP); Hitoshi Komoda, Kaga (JP); Masaru Makino, Kaga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/101,081

(22) Filed: Apr. 6, 2005

(65) Prior Publication Data

US 2005/0178724 A1 Aug. 18, 2005

Related U.S. Application Data

(62) Division of application No. 10/121,246, filed on Apr. 12, 2002, now Pat. No. 6,894,203.

(30) Foreign Application Priority Data

Apr. 13, 2001 (JP) .............................. 2001-115527

(51) Int. Cl.
  B09C 1/10 (2006.01)
  C02F 3/28 (2006.01)
  C02F 101/36 (2006.01)
  C02F 101/38 (2006.01)
  C02F 103/06 (2006.01)
  C02F 101/16 (2006.01)

(52) U.S. Cl. ...................... 588/319; 210/610; 210/747; 405/128.5; 588/405; 588/406; 588/408; 588/413

(58) Field of Classification Search ................ 588/313, 588/319, 405, 406, 408, 413; 405/128.5; 210/610, 747

See application file for complete search history.

(56) References Cited

U.S. PATENT DOCUMENTS

| | | | |
|---|---|---|---|
| 3,883,397 | A | 5/1975 | Townsley |
| 5,414,206 | A | 5/1995 | Ritter |
| 5,414,207 | A | 5/1995 | Ritter |
| 5,725,470 | A | 3/1998 | Lazarowitz et al. |
| 5,928,433 | A * | 7/1999 | Jahnke et al. ................... 134/2 |
| 6,039,882 | A * | 3/2000 | Wolfe et al. ................ 588/316 |
| 6,090,896 | A * | 7/2000 | Jahnke et al. ............... 525/404 |
| 6,183,642 | B1 | 2/2001 | Heijnen et al. |
| 6,207,073 | B1 * | 3/2001 | Wolfe et al. ................ 252/175 |
| 6,303,367 | B1 | 10/2001 | Kataoka et al. |
| 6,303,795 | B1 * | 10/2001 | Jahnke et al. ............... 548/547 |
| 6,551,511 | B1 | 4/2003 | Murasawa |
| 6,584,988 | B1 * | 7/2003 | Lazarowitz ................ 134/25.1 |

FOREIGN PATENT DOCUMENTS

| | | |
|---|---|---|
| EP | 0 546 649 A2 | 6/1993 |
| EP | 0 909 593 A2 | 4/1999 |
| EP | 0 968 773 A1 | 1/2000 |
| EP | 1 057 787 A2 | 12/2000 |
| JP | 6169641 | 6/1994 |
| JP | 9276894 | 10/1997 |
| JP | 11090484 | 4/1999 |
| JP | 11128902 | 5/1999 |
| JP | 11-262751 | 9/1999 |
| JP | 2000-125850 | 5/2000 |
| JP | 2000-254687 | 9/2000 |
| JP | 2001008550 | 1/2001 |
| JP | 2001-087754 | 4/2001 |
| JP | 2001-300509 | 10/2001 |

OTHER PUBLICATIONS

Yusaku Miyake, "Ionkokanjushi Niyoru Chikasuichu no Shosanseichisso jokyo (removal of nitrate nitrogen in underground water by ion exchange resin)"; "Yosui to Haisui (irrigation water and waste water)", published by Sangyo Yosui Chosakai; vol. 34, No. 7 (1992); pp. 25-33.

Daichi Maruoka et al.; "Shosansei Ashosansei Chisso Osen Chikasui no Bioremediation (bioremediation of nitrate nitrite nitrogen-polluted underground water)"; "Yosui to Haisui (irrigation water and waste water)", published by Sangyo Yosui Chosakai; vol. 41, No. 10 (1999); pp. 40-45.

David E. Ellis et al.; "Bioaugmentation for Accelerated In Situ Anaerobic Bioremediation"; Environmental Science and Technology 2000; vol. 34, No. 11 (2000); pp. 2254-2260.

English summary of Miyake, "Ionkoukanjushi niyoru Chikasuichu no Shosanseichisso Jokyo," disclosed as reference AF in the IDS filed Jul. 12, 2002.

English summary of Maruoka et al., "Shosansei Ashosansei Chisso Osen Chikasui no Bioremediation," disclosed as reference AG in the IDS filed Jul. 12, 2002.

Machine translation of JP 2000-125850 cited above.

* cited by examiner

*Primary Examiner*—Stanley S. Silverman
*Assistant Examiner*—Ardith E. Hertzog
(74) *Attorney, Agent, or Firm*—Sheridan Ross P.C.

(57) ABSTRACT

A method of decreasing nitrate nitrogen and volatile organic compounds in soil and groundwater by burying a fatty acid having 10 or more carbon atoms, an alcohol having 12 or more carbon atoms, an ester of a linear saturated fatty acid having 14 or more carbon atoms and a monohydric alcohol, an ester of a linear saturated fatty acid having 14 or more carbon atoms and a polyhydric alcohol, an ester of a fatty acid having 16 or more carbon atoms and glycerine, and the like in soil containing nitrate nitrogen and volatile organic compounds or by contacting groundwater with same. This method allows for on site treatment, high biological denitrification and a decrease in volatile organic compounds secondary pollution by the release of organic matter and nitrogen into the environment.

4 Claims, 4 Drawing Sheets

F I G. 4
(a)
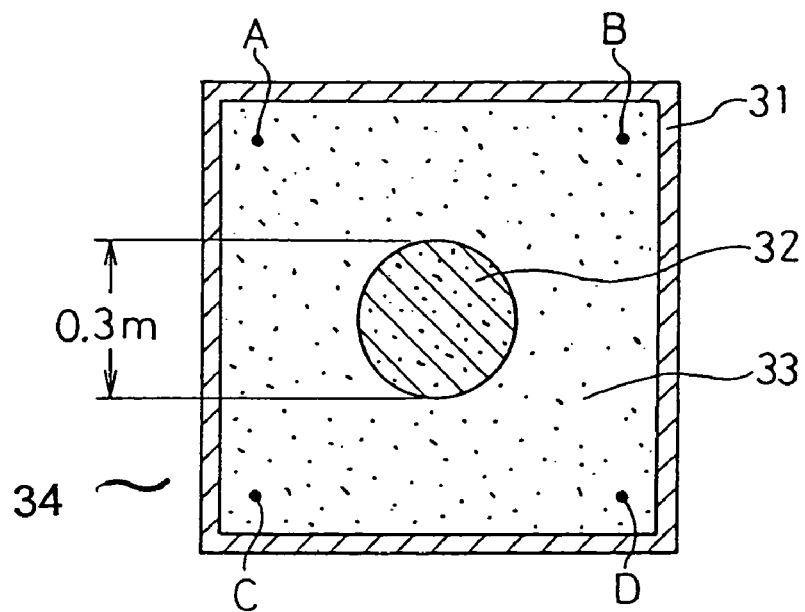
(b)
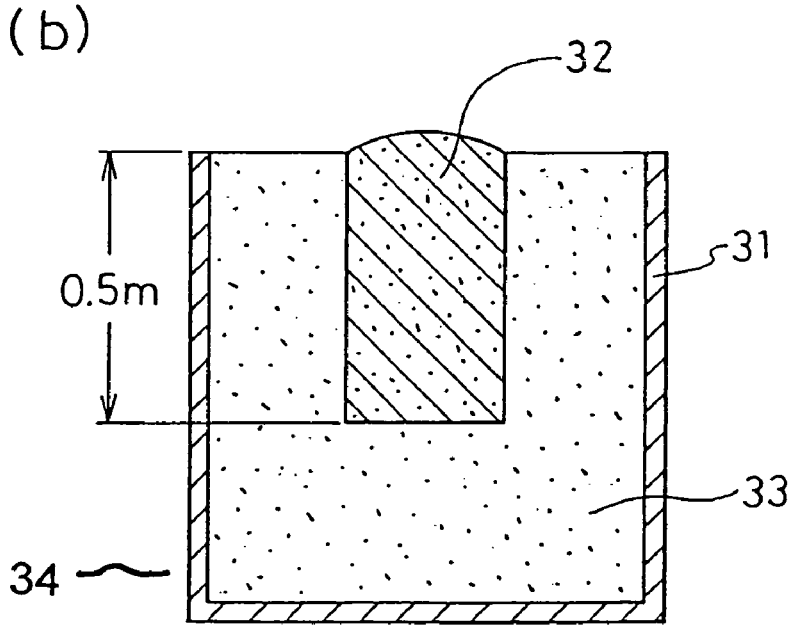

METHOD OF DECREASING NITRATE NITROGEN AND VOLATILE ORGANIC COMPOUND IN SOIL AND GROUNDWATER

CROSS REFERENCED TO RELATED APPLICATIONS

The present application is a divisional of U.S. patent application Ser. No. 10/121,246, now U.S. Pat. No. 6,894,203, filed Apr. 12, 2002, which claims foreign priority benefits under 35 USC § 119 of Japanese Patent Application No. 2001-115527, filed Apr. 31, 2001. Both applications are incorporated herein by this reference in their entirety.

BACKGROUND OF THE INVENTION

The present invention relates to a method of decreasing nitrate nitrogen and volatile organic compounds present in soil and groundwater.

Recently, there is found explicit pollution by nitrate nitrogen in soil and groundwater caused by high density agriculture and excess fertilizing for cultivating crops requiring high nitrogen fertilization typified by tea cultivation.

As the countermeasure for such pollution of groundwater, there is already known a technology of evacuating groundwater to ground and concentrating and removing nitrate nitrogen using an ion exchange resin. As the example of such technology, there is one described in "Yosui to Haisui (irrigation water and waste water)" published by Sangyo Yosui Chosakai, vol. 34, No. 7 (1992), Yusaku Miyake, "Ionkokanjushi niyoru Chikasuichu no Shosanseichisso jokyo (removal of nitrate nitrogen in groundwater by ion exchange resin)".

As the method of removing nitrate nitrogen in soil, there is a biological denitrification method. As the example using this biological denitrification method, there are well known examples such as an example using soy bean oil as a carbon source for a denitrification bacteria ("Yosui to Haisui (irrigation water and waste water)" published by Sangyo Yosui Chosakai, vol. 41, No. 10 (1999), Daichi Maruoka, "Shosansei Ashosansei Chisso Osen Chikasui no Bioremediation (bioremediation of nitrate nitrite nitrogen-polluted groundwater)" an example of adding high test syrup and/or isomerized sugar to soil (Japanese Laid-open Patent Application No. Hei 6-169641), an example of adding a carrier for a denitrification bacteria to soil (Japanese Laid-open Patent Application No. Hei 11-128902), an example of adding a fermentation material obtained by using seaweeds and diatomaceous earth to soil (Japanese Laid-open Patent Application No. 2001-8550) and the like.

Further, regarding volatile organic compounds such as dichloromethane, carbon tetrachloride, 1,2-dichloroethane, 1,1-dichloroethylene, cis-1,2-dichloroethylene, 1,1,1-trichloroethane, 1,1,2-trichloroethane, trichloroethylene, tetrachloroethylene, benzene, 1,3-dichloropropene and the like in soil and groundwater, there is a problem of secondary pollution by discharge of these volatile organic compounds into environment. As the method of decreasing a volatile organic compound to prevent such secondary pollution, there is a method which utilizes microorganisms present in soil. It is known that such microorganisms are effectively decomposed in the presence of a hydrogen donor and a nutrient salt of phosphorus, nitrogen and the like. A method of decreasing such volatile organic compound is described, for example, in D. E. Ellis, et al., Environmental Science and Technology, 34(11), p2254 (2000). Japanese Laid-open Patent Applications No. Hei 9-276894 and No. Hei 11-90484 disclose methods of decreasing a volatile organic compound using an organic substance which is liquid at normal temperature such as citric acid and ethanol as the hydrogen donor.

The conventional methods of decreasing nitrate nitrogen and volatile organic compounds had the following problems.

In the conventional technology of removing nitrate nitrogen in groundwater, groundwater is once evacuated to the ground and nitrate nitrogen is concentrated by ion exchange, and there was a necessary for reprocessing of the concentrated nitrate nitrogen. Since groundwater is thus once evacuated to ground and subjected to ion exchange treatment, this is not accepted as on site treatment in strict meaning, and there was a problem that the structure is large and complicated.

In the conventional biological denitrification method, since water-soluble organic matter such as saccharides and the like and organic matter which are liquid at normal temperature even if not water soluble are added to soil and groundwater, there was a problem that organic matter move easily and are diffused in soil, and there was a high possibility of occurrence of secondary pollution by organic matter.

Further, regarding the conventional biological denitrification method, in method disclosed in Japanese Laid-open Patent Application No. Hei 11-128902 of adding a carrier for a denitrification bacteria into soil, there was a problem that when an organic substance which can be efficiently utilized by a denitrification bacteria does not co-exist, biological denitrification cannot be effected efficiently and a substance of a denitrification bacteria such as cellulose and the like cannot necessarily become an effective hydrogen donor.

For example, as disclosed in Japanese Laid-open Patent Application No. Hei 2001-8550 the method of using a waste of a certain kind of natural resource as a carbon source is preferable in the aspect of effective utilization of waste, however, since a natural water necessarily contains nitrogen originally, there is contrarily a possibility that such natural waste functions as a nitrogen supply source even in the case of use of such waste for the purpose of removal of nitrogen.

On the other hand, in the case of removal of a volatile organic substance, when a bacteria was used, a hydrogen donor and a nutrient salt of nitrogen, phosphorus and the like were water-soluble, consequently, these were easily diffused in soil and groundwater, leading to a possibility of secondary pollution.

BRIEF SUMMARY OF THE INVENTION

The present invention solves these problems in conventional technologies, and an object thereof is to provide a method of decreasing nitrate nitrogen and volatile organic compounds in soil and groundwater, in which on site treatment is possible, a high biological denitrification ability and a volatile organic compound decreasing ability are provided, discharge of organic matter and nitrogen from soil into environment is prevented, and secondary pollution is extremely little.

The present inventors have intensively studied to solve the problems in the conventional technologies, and resultantly found that the above-mentioned problems are solved by using a specific chemical substance group having specific carbon number and specific chemical structure and further placing such chemical substance group in specific form in environment, leading to completion of the present invention.

Namely, the method of decreasing nitrate nitrogen and volatile organic compounds in soil and groundwater of the present invention is conducted by the following methods.

1. Fatty acids having a carbon number of 10 or more, for example, a fatty acid having a linear saturated structure is mixed in soil or groundwater.
2. Alcohols having a carbon number of 12 of more, for example, an alcohol having a saturated structure is mixed in soil or groundwater.
3. Esters of i) a linear saturated fatty acid having a carbon number of 14 or more and ii) monohydric acohol are mixed in soil or groundwater.
4. Esters of i) a linear saturated fatty acid having a carbon number of 14 or more and ii) polyhydric alcohol or a derivative thereof are mixed in soil or groundwater.
5. Esters of i) a fatty acid having a carbon number of 16 or more and ii) glycerine are mixed in soil or groundwater.
6. A fatty amine having a carbon number of 12 or more or a fatty amide having a carbon number of 12 or more is mixed in soil or groundwater.
7. Iron or aluminum is mixed with the above-mentioned substances.
8. In mixing a fatty amine having a carbon number of 12 or more or a fatty amide having a carbon number of 12 or more in soil or groundwater, a bacteria is also mixed which has been previously cultured in an medium containing the fatty amine having a carbon number of 12 or more or fatty amide having a carbon number of 12 or more and the substance contaminating the soil or groundwater to be treated.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 4 is a view showing the structure of an experiment facility used in Examples 4 to 7 according to the present invention.

Figure 1:
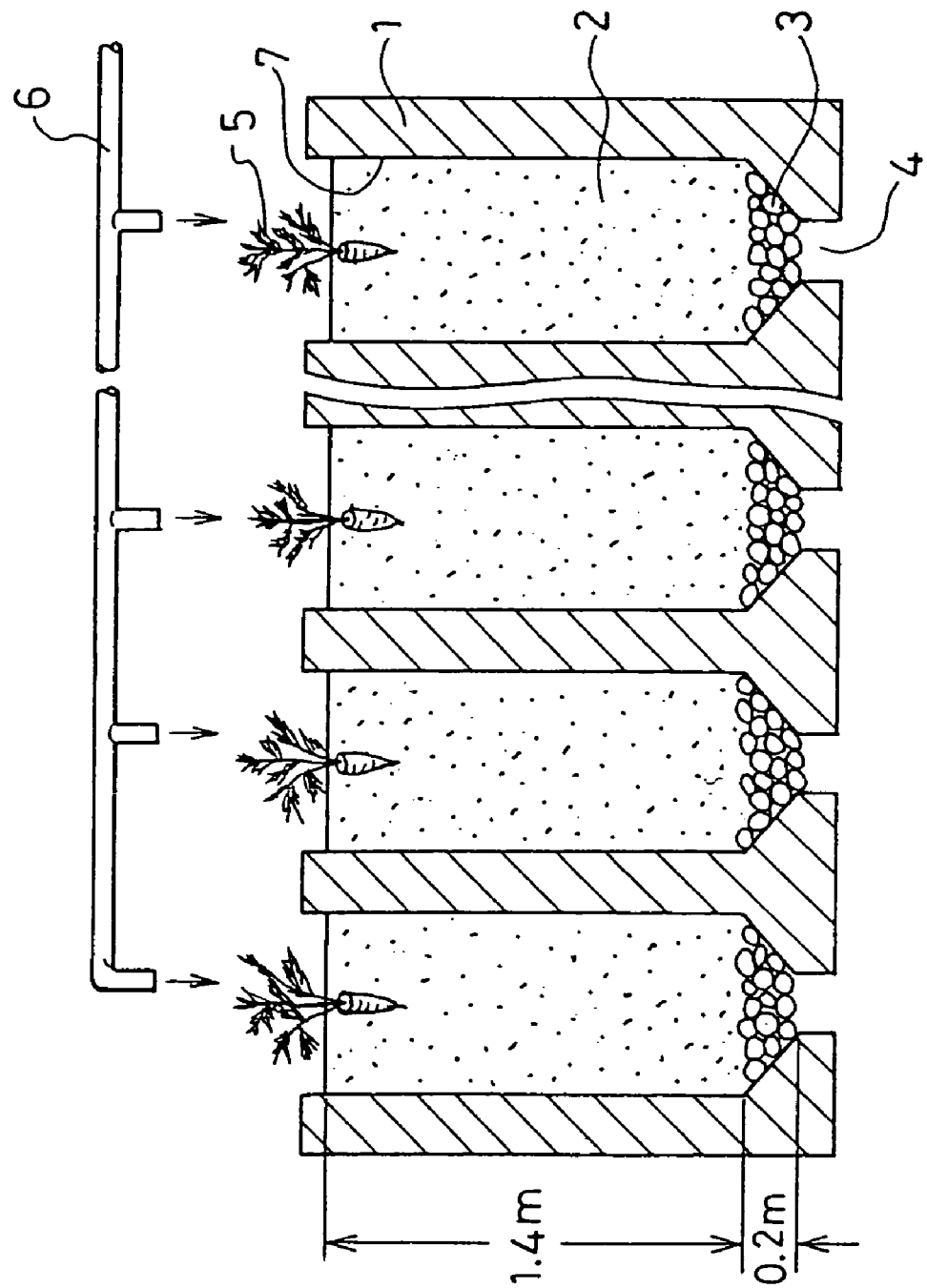
FIG. 1 is a sectional view showing the structure of an artificial soil experiment facility used in Example 1 according to the present invention.

It will be recognized that some or all of the Figures are schematic representations for purposes of illustration and do not necessarily depict the actual relative sizes or locations of the elements shown.

DETAILED DESCRIPTION OF THE INVENTION

The fatty acid used in the method of decreasing nitrate nitrogen and volatile organic compounds in soil and groundwater of the present invention is a chemical substance having a structure of the following general formula (1) when an alkyl group is represented by R. In this case, it is essential that the carbon number is 10 or more.

$$R\text{—COOH} \tag{1}$$

The fatty acid used in the method of decreasing nitrate nitrogen and volatile organic compounds of the present invention is more preferably a fatty acid comprising only single bonds (hereinafter, referred to as saturated type) of the general formula (1) wherein the alkyl chain is linear.

The fatty acid is substantially water-insoluble, and when the carbon number is less than 10, melting point thereof is low, the acid is liquid at normal temperature and are easily diffused in soil and groundwater, leading to a high possibility of secondary pollution by organic matter. Therefore, such fatty acids are not preferable. Even if the carbon number is 10 or more, presence of a double bond is not preferable since then decrease in melting point is generally caused. Further, presence of a side chain and a benzene ring and the like is not preferable in treatment using bacteria since then biodegradability itself is lowered.

Therefore, the fatty acid used in the method of decreasing nitrate nitrogen and volatile organic compounds of the present invention has 10 or more carbon atoms, and is linear and saturated. As the fatty acid satisfying the above-mentioned requirements, capric acid, lauric acid, myristic acid, palmitic-acid, stearic acid, arachidic acid, lignoceric acid, behenic acid, and mixtures, salts and hydrogenated substances of these fatty acids, and the like are exemplified.

The mixture may be an artificial mixture of fatty acid single bodies, or a mixture of beef tallow fatty acids, coconut oil fatty acids and the like.

The alcohol used in the method of decreasing nitrate nitrogen and volatile organic compounds of the present invention is a chemical substance having a structure of the following general formula (2) when an alkyl group is represented by R. In this case, it is essential that the carbon number is 12 or more.

$$R\text{—OH} \tag{2}$$

The alcohol used in the method of decreasing nitrate nitrogen and volatile organic compounds of the present invention is more preferably alcohol of the general formula (2) in which the alkyl group is linear and of saturated type.

The alcohol is substantially water-insoluble, and when the carbon number is less than 12, melting-point thereof is low, the alcohol is liquid at normal temperature and are easily diffused in soil and groundwater, leading to a high possibility of secondary pollution by organic matter. Therefore, such alcohols are not preferable. Even if the carbon number is 12 or more, presence of a double bond is not preferable since then decrease in melting point is generally caused.

Therefore, the alcohol used in the method of decreasing nitrate nitrogen and volatile organic compounds of the present invention has 12 or more carbon atoms, and is linear and saturated. As the alcohol satisfying the above-mentioned requirements, lauryl alcohol, myristyl alcohol, stearyl alcohol, cetyl alcohol, behenyl alcohol, and mixtures and salts of these alcohols, and the like are exemplified.

The mixture may be an artificial mixture of alcohol single bodies, or a mixture of natural alcohols.

The ester of a fatty acid and monohydric alcohol used in the method of decreasing nitrate nitrogen and volatile organic compounds of the present invention is a chemical substance having a structure of the following general formula (3) when an alkyl group is represented by $R_1$ and $R_2$. In this case, it is essential that the fatty acid has 14 or more carbon atoms and is linear and saturated.

$$R_1COOR_2 \tag{3}$$

When the carbon number of the fatty acid is less than 14, melting point thereof is low, the acid is liquid at normal temperature and are easily diffused in soil and groundwater, leading to a high possibility of secondary pollution by organic matter. Therefore, such fatty acids are not preferable. Even if the carbon number is 14 or more, presence of a double bond is not preferable since then decrease in melting point is generally caused. Further, presence of a side chain and a benzene ring and the like is not preferable in treatment using bacteria since then biodegradability itself is lowered.

Therefore, the ester of a fatty acid and monohydric alcohol used in the method of decreasing nitrate nitrogen and volatile organic compounds of the present invention has 14 or more carbon atoms, and is linear and saturated. As the fatty acid satisfying the above-mentioned requirements, myristyl myristate, cetyl palmitate, stearyl stearate, methyl stearate, butyl stearate, cholesteryl stearate, batyl stearate, octyldodecyl behenate, behenyl behenate, and mixtures of these esters, distearyl phthalate in which the fatty acid is dibasic acid, and the like are exemplified.

It is essential that in the ester of a fatty acid and polyhydric alcohol, or derivative thereof used in the method of decreasing nitrate nitrogen and volatile organic compounds of the present invention, the fatty acid has 14 or more carbon atoms and is linear and saturated.

When the carbon number of the fatty acid is less than 14, melting point thereof is low, the acid is liquid at normal temperature and are easily diffused in soil and groundwater, leading to a high possibility of secondary pollution by organic matter. Even if the carbon number of the fatty acid is 14 or more, presence of a double bond is usually not preferable since then decrease in melting point is generally caused. Further, presence of a side chain and a benzene ring and the like is not preferable in treatment using bacteria since then biodegradability itself is lowered.

Therefore, the ester of a fatty acid and polyhydric alcohol, or derivative thereof used in the method of decreasing nitrate nitrogen and volatile organic compounds of the present invention has 14 or more carbon atoms and is linear and saturated. As the fatty acid satisfying the above-mentioned requirements, sorbitan monomyristate, sorbitan monopalmitate, sorbitan monostearate, sorbitan distearate, sorbitan tristearte, sorbitan monobehenate, polyoxyethylene sorbitan monostearate, polyethylene glycol monostearate, polyethylene glycol distearate, sorbitan sesquistearate, sorbitan tristearate, polyoxyethylenesorbitol hexastearate, and mixtures of these esters, and ethers such as polyoxyethylene lauryl ether, polyoxyethylene cetyl ether, polyoxyethylene stearyl ether, polyoxyethylene behenyl ether, glycerine cetyl ether, glycerine stearyl ether, polyoxyethylene polyoxypropylene cetyl ether, polyoxyethylene polyoxypropylene decyltetradecyl ether, polyoxyethylene octylphenyl ether and the like, are exemplified.

The ester of a fatty acid and glycerine used in the method of decreasing nitrate nitrogen and volatile organic compounds of the present invention is a chemical substance having a structure of the following general formula (4) or general formula (5) when an alkyl group is represented by $R_1$, $R_2$ and $R_3$. In this case, it is essential that the fatty acid has 16 or more carbon atoms.

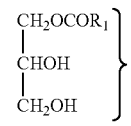

(4)

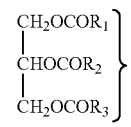

(5)

When the carbon number of the fatty acid is less than 16, melting point thereof is low, the acid is liquid at normal temperature and are easily diffused in soil and groundwater, leading to a high possibility of secondary pollution by organic matter.

Therefore, the ester of a fatty acid and glycerine used in the method of decreasing nitrate nitrogen and volatile organic compounds of the present invention contains a fatty acid having 16 or more carbon atoms. As the fatty acid satisfying the above-mentioned requirements, stearic monoglyceride, palmitic stearic monoglyceride, oleic monoglyceride, stearic monodiglyceride, oleic stearic monodiglyceride, oleic stearic monoglyceride, behenic monoglyceride, tetragryceryl mono-stearate, tetraglyceryl tristearate, tetraglyceryl pentastearate, hexaglyceryl monostearate, hexaglyceryl pentastearate, decaglyceryl monostearate, decaglyceryl distearate, decaglyceryl tristearate, decaglyceryl pentastearate, decaglyceryl heptastearate, decaglyceryl decastearate, polyoxyethylene glycerin monostearate, polypropylene glycol monostearate, and mixtures of these esters, and the like are exemplified.

The fatty amine used in the method of decreasing nitrate nitrogen and volatile organic compounds of the present invention is a primary amine of the following general formula (6), a secondary amine of the following general formula (7), a tertiary amine of the following general formula (8), a diamine of the following general formula (9) or an alkylamine acetate of the following general formula (10), when an alkyl group is represented by R. It is essential that the fatty acid has 12 or more carbon atoms.

$RNH_2$ (6)

$R_2NH$ (7)

$RN(CH_3)_2$ (8)

$RNHCH_2CH_2CH_2NH_2$ (9)

$RNH_2 \cdot CH_3COOH$ (10)

The fatty amine used in the method of decreasing nitrate nitrogen and volatile organic compounds of the present invention is more preferably an fatty amine of the following general formula (6) to general formula (10) in which an alkyl is linear and saturated.

Further, the fatty amine is more preferably a fatty amine having a carbon number, in the case of a secondary amine, of 16 or more, in the case of a tertiary amine, of 22 or more, in the case of a diamine, of 16 or more, and in the case of an alkylamine acetate, of 14 or more.

When the carbon number is less than the defined number as described above, melting point thereof is low, the amine is liquid at normal temperature and are easily diffused in soil and groundwater, leading to a high possibility of secondary pollution by organic matter. Even if the carbon number is not less than the above-mentioned defined number, presence of a double bond is usually not preferable since then decrease in melting point is generally caused. Further, presence of a side chain and a benzene ring and the like is not preferable in treatment using bacteria since then biodegradability itself is lowered.

Therefore, the fatty amine used in the method of decreasing nitrate nitrogen and volatile organic compounds of the present invention has a carbon number, in the case of a secondary amine, of 16 or more, in the case of a tertiary amine, of 22 or more, in the case of a diamine, of 16 or more, and in the case of an alkylamine acetate, of 14 or more. As the fatty amine satisfying the above-mentioned requirements, laurylamine, myristylamine, stearylamine, dipalmitylamine, distearylamine, dimethylbehenylamine, palmitylpropylenediamine, stearylpropylenediamine, myristylamine acetate, stearylamine acetate, diethyl stearate aminoethylamide, diethyl stearate aminopropylamide, and mixtures and salts of these fatty amines, and the like are exemplified.

It is essential that the fatty amide used in the method of decreasing nitrate nitrogen and volatile organic compounds of the present invention has 12 or more carbon atoms.

When the carbon number is less than 12, melting point thereof is low, the amide is liquid at normal temperature and are easily diffused in soil and groundwater, undesirably leading to a high possibility of secondary pollution by organic matter.

As the fatty amide satisfying the above-mentioned requirements, lauric amide, myristic amide, palmitic amide, stearic amide, oleic amide, erucic amide, ethylenebisstearic amide, dipalmityl ketone, distearyl ketone, and mixtures of these fatty amides, and the like are exemplified.

Any of iron and aluminum used in the method of decreasing nitrate nitrogen and volatile organic compounds of the present invention is not particularly restricted in purity, size, form and the like providing a metal single body is used as the main component, and a particle having a diameter of 1 cm or less is preferable to increase the surface area.

The bacteria used in the method of decreasing nitrate nitrogen and volatile organic compounds of the present invention may advantageously be that previously cultured under conditions used in the method of decreasing nitrate nitrogen and volatile organic compounds of the present invention, and the kinds of bacteria and fungi and whether they are derived from natural field or not are not restricted.

For implementation of the method of decreasing nitrate nitrogen and volatile organic compounds of the present invention, it may be advantageous in the case of groundwater that fatty acid, alcohol and the like of the present invention are directly added into groundwater through a hole formed by works such as boring and the like or already-formed well at the intended place. Further, it is also possible in the present invention to provide a constitution in which groundwater is evacuated by a pump and the like and the evacuated groundwater is passed through the fatty acid, alcohol and the like of the present invention.

According to such a treatment method, an indigenous denitrification bacteria utilizes a fatty acid and alcohol of the present invention and biodegraded products thereof as a hydrogen donor and a denitrification reaction occurs efficiently, consequently, nitrate nitrogen in groundwater can be removed.

In the feature of the present invention, a hydrogen donor such as a fatty acid and alcohol and the like of the present invention is present in the form of solid in soil and groundwater, consequently, movement of a fatty acid and alcohol is extremely brief and restrictive, and secondary pollution by organic matter is suppressed to the minimum extent.

When it is judged that phosphorus in groundwater is deficient based on water quality measurement results by preliminary field examination, it is preferable that a water-soluble phosphate salt and the like are added into soil and groundwater together with the hydrogen donor of the present invention. Thus, when a denitrification bacteria is simultaneously added in the method of decreasing nitrate nitrogen and volatile organic compounds of the present invention, it becomes possible to further promote the effect of the present invention.

By burying a fatty acid, alcohol and the like of the present invention directly in soil at lower part of farming field and the like, nitration of a nitrogen fertilizer progresses to provide nitrate nitrogen, then, an indigenous denitrification bacteria utilizes a fatty acid, alcohol and the like used in the present invention as a hydrogen donor, and a denitrification reaction occurs efficiently. By this, outflow of nitrate nitrogen into groundwater can be avoided, according to the present invention. Since a decreasing agent such as a fatty acid, alcohol and the like used in the present invention is present in the form of solid in soil, movement thereof is extremely brief and restrictive, and secondary pollution by discharge of organic matter into environment can be suppressed to the minimum extent.

The fatty acid, alcohol and the like used in the present invention are solid in soil, and there is no necessity to provide a carrier separately to make themselves into a carrier, and a denitrification bacteria utilizing a fatty acid, alcohol and the like used in the present invention as a hydrogen donor can also effect a denitrification reaction using neighboring soil as a carrier.

As the method of decreasing the volatile organic compound of the present invention, there are three methods described below.

1. A method in which a hydrogen donor such as a fatty acid, alcohol, sulfur, sulfur compound, biodegradable resin and the like used in the present invention is directly buried in polluted soil.

2. A method in which polluted soil is dug, and a hydrogen donor such as a fatty acid, alcohol, sulfur, sulfur compound, biodegradable resin and the like used in the present invention is buried in a pile formed with this soil.

3. A method in which a hydrogen donor such as a fatty acid, alcohol, sulfur, sulfur compound, biodegradable resin and the like used in the present invention and necessary nutrient salts are directly added into groundwater.

The hydrogen donor such as a fatty acid, alcohol, sulfur, sulfur compound, biodegradable resin and the like used in the present invention acts as a hydrogen donor for an indigenous volatile organic compound decomposed bacteria, and can decomposed a volatile organic compound effectively.

In the present invention, a hydrogen donor such as a fatty acid, alcohol, sulfur, sulfur compound, biodegradable resin and the like is present in the form of solid in soil, therefore, movement thereof is extremely brief and restrictive, and secondary pollution by discharge of volatile organic compounds into environment is suppressed to the minimum extent.

In the case of a hydrogen donor such as a fatty acid, alcohol and the like used in the present invention containing no nitrogen atom and when nitrogen is necessary as a nutrient salt, a nitrogen component may advantageously be added separately.

In the case of inclusion of a nitrogen atom such as a fatty amine, fatty amide and the like used in the present invention, a function as a nitrogen feeding source is also manifested simultaneously with a function as a hydrogen donor, and there is no necessity to feed a nitrogen component separately. Namely, under such a constitution, nitrogen is also fed in the form of solid, and movement is extremely restricted, consequently, secondary pollution can be decreased without discharge of surplus nitrogen into environment, more preferably.

The sulfur used in the present invention effects hydrogen donation to a bacteria called a sulfur bacteria, to cause a denitrification reaction. Preferably, an alkali feeding agent is allowed to coexist with sulfur. By neutralization with an alkali feeding agent of pH reduction due to sulfuric acid occurring in hydrogen donation of sulfur, a denitrification reaction can be caused without remarkably changing pH of soil.

Addition of a metal such as iron, aluminum and the like simultaneously with the above-mentioned hydrogen donor is preferable for enhancing a reduction atmosphere in the intended groundwater and soil. This is due to the action of hydrogen occurring according to the following formulae (11) and (12). Therefore, by thus adding a hydrogen donor and a metal simultaneously, denitrification speed and decomposition speed of a volatile organic compound can be improved.

$$Fe + H_2O \rightarrow Fe^{2+} + OH^- + H_2 \uparrow \qquad (11)$$

$$Al + OH^- + H_2O \rightarrow AlO_2^- + 1.5H_2 \uparrow \qquad (12)$$

Simultaneous addition of a hydrogen donor such as a fatty acid, alcohol and the like used in the present invention and a bacteria previously cultured in a medium essentially containing the intended volatile organic compound can further improve the decomposition speed of the volatile organic compound, more preferably.

For burying a hydrogen donor such as a fatty acid, alcohol and the like used in the present invention into soil or adding it into well water, it is also possible that a hydrogen donor of the present invention is molded into a granule for improvement of flowability and the granule is added, or that melted by excessively heating to the melting point or more is injected into soil while maintaining flowable condition.

EXAMPLES

The following examples will specifically illustrate the present invention further in detail below, but do not limit the scope of the invention.

Example 1

FIG. 1 is a sectional view showing an artificial soil experiment facility used for effecting a soil experiment in a method of decreasing nitrate nitrogen and volatile organic compounds in Example 1.

As shown in FIG. 1, the artificial soil experiment facility used in Example 1 has 14 compartments of experiment baths 7 separated mutually by a concrete frame 1, and a measurement water incorporating port 4 is formed at the bottom of these experiment baths 7. On each experiment bath 7, nozzles are placed for adding a nitrate nitrogen solution, and these nozzles are communicated with a pipe 6 in which the nitrate nitrogen solution flows.

The following experiments were conducted using the artificial soil experiment facility constituted as described above.

In the experiment bath 7, a gravel layer 3 and experiment soil 2 are placed. In each experiment soil 2, a carrot seedling 5 is planted.

The ground surface area of the experimental bath 7 was 11 $m^2$, and the soil depth of the experimental soil 2 was 1.4 m. Kuroboku soil was used as the experimental soil 2. Under this experiment soil 2, a gravel layer 3 is formed by placing gravels at a thickness of 20 cm from the bottom.

In 14 compartments of experiment layers 7, five carrot seedlings having a leaf length of about 14 cm were planted in each compartment, and a nitrate nitrogen solution of which nitrate nitrogen concentration had been previously controlled to 90 mg/L was added continuously at a rate of 100 mL/day using a metering pump. Of 14 compartments of experiment layers 7, in compartments Nos. 1 to 9, experiment materials of the present invention were mixed in soil, and in compartments Nos. 10 to 14, comparative materials were mixed in soil, before experiments.

The experiment soils 2 in each test district and comparative district were made by uniformly mixing experiment materials (fatty acid, alcohol and the like) and comparative materials (materials used in conventional technologies) in a soil dry weight ratio of 1 wt %, previously.

In the artificial soil experiment facility constituted as described above, water passed through the gravel layer 3 was collected, and analyses of the nitrate nitrogen concentration, ammonia nitrogen concentration and total carbon concentration after 65 days were conducted according to JIS methods.

The experiment results are shown in Table 1.

TABLE 1

| | Compartment No. | Experiment materials | Nitrate nitrogen concentration (mg/L) after 65 days | Ammonia nitrogen concentration (mg/L) after 65 days | Whole carbon concentration (mg/L) after 65 days |
|---|---|---|---|---|---|
| Experiment district | 1 | Stearic acid | 22 | 0.07 | 0.7 |
| | 2 | lauryl alcohol | 18 | 0.12 | 0.9 |
| | 3 | Cetyl palmitate | 20 | 0.09 | 0.9 |
| | 4 | Sorbitan distearate | 14 | 0.10 | 1.7 |

TABLE 1-continued

|  | Compartment No. | Experiment materials | Nitrate nitrogen concentration (mg/L) after 65 days | Ammonia nitrogen concentration (mg/L) after 65 days | Whole carbon concentration (mg/L) after 65 days |
|---|---|---|---|---|---|
|  | 5 | Palmitic stearic monoglyceride | 19 | 0.10 | 0.6 |
|  | 6 | Mixture Stearic acid: 65 wt % | | | |
|  |  | Palmitic acid: 30 wt % | 16 | 0.08 | 1.1 |
|  |  | Myristilate: 5 wt % | | | |
|  | 7 | Sulfer (particle size: about 2 cm) | 29 | 0.08 | 0.6 |
|  | 8 | Mixture of sulfer and calcium carbonate (weightratio, 3:8) | 21 | 0.07 | 0.5 |
|  | 9 | Stearic acid + iron powder: 1 wt % | 13 | 0.06 | 0.8 |
| Comparative district | 10 | Cellulose powder | 76 | 0.08 | 2.5 |
|  | 11 | Lactose | 41 | 0.39 | 21.0 |
|  | 12 | Soy bean oil | 53 | 0.28 | 9.0 |
|  | 13 | Natural bark fermentation material | 50 | 4.60 | 12.0 |
|  | 14 | Control (no addition) | 74 | 0.08 | 0.8 |

As shown in Table 1, in compartment Nos. 1 to 5 in the test district, stearic acid, lauryl alcohol, cetyl palmitate, sorbitan distearate, palmitic stearic monodiglyceride were used, respectively, as experiment materials. In compartment No. 6 in the test district, 65 wt % of stearic acid, 30 wt % of palmitic acid and 5 wt % of myristilate were mixed as used as an experiment material. In compartment No. 7 in the test district, sulfur (particle size: about 2 cm) was used as an experiment material. In compartment No. 8 in the test district, a mixture of sulfur and calcium carbonate (weight ratio, 3:8) was used as an experiment material. In compartment No. 9 in the test district, stearic acid and an iron powder having an average particle size of about 15 μm were mixed in a ratio of 1 wt % based on-soil and used.

As the comparative materials in compartment Nos. 10 to 13 in the comparative district, a cellulose powder, lactose, soy bean oil and natural bark fermentation material were mixed in soil and used. In compartment No. 14 in the comparative district, no material was mixed and soil was solely used.

In Table 1, the experiment materials used in the test district are materials used in the method of decreasing nitrate nitrogen and volatile organic compounds in soil and groundwater of the present invention, and the comparative materials used in compartment Nos. 10 to 13 in the comparative district were materials used in conventional technologies. Compartment No. 14 in the comparative district is composed only soil.

As apparent from Table 1, water from soil (test district) according to the method of decreasing nitrate nitrogen and volatile organic compounds in soil and groundwater of the present invention has a nitrate nitrogen concentration lowered significantly as compared with water from compartments of conventional technologies and the compartment composed only of soil shown as the comparative district, and it can be understood that a denitrification reaction occurs effectively in passing through soil.

By coexistence of an iron powder (compartment No. 9), reducing property in soil is improved, promoting a denitrification reaction further.

Further, in the method of decreasing nitrate nitrogen and volatile organic compounds of the present invention, the total carbon concentration is extremely small and secondary pollution by organic matter can be effectively prevented as compared with conventional technologies shown in the comparative district.

As apparent from the results of the ammonia nitrogen concentration, a nitrogen releasing source as found in the natural bark fermentation material (compartment No. 13) of the conventional technology is not provide in the experiment soil according to the present invention.

Through the experiments in Example 1, significant difference in growth of carrot was not recognized.

It is known from above-mentioned experiment results that the method of decreasing nitrate nitrogen and volatile organic compounds of the present invention can be applied of course to soil itself, and also has an excellent effect that leakage of nitrate nitrogen into groundwater passing through the soil and secondary pollution by organic compounds can be decreased.

Example 2

Figure 2:
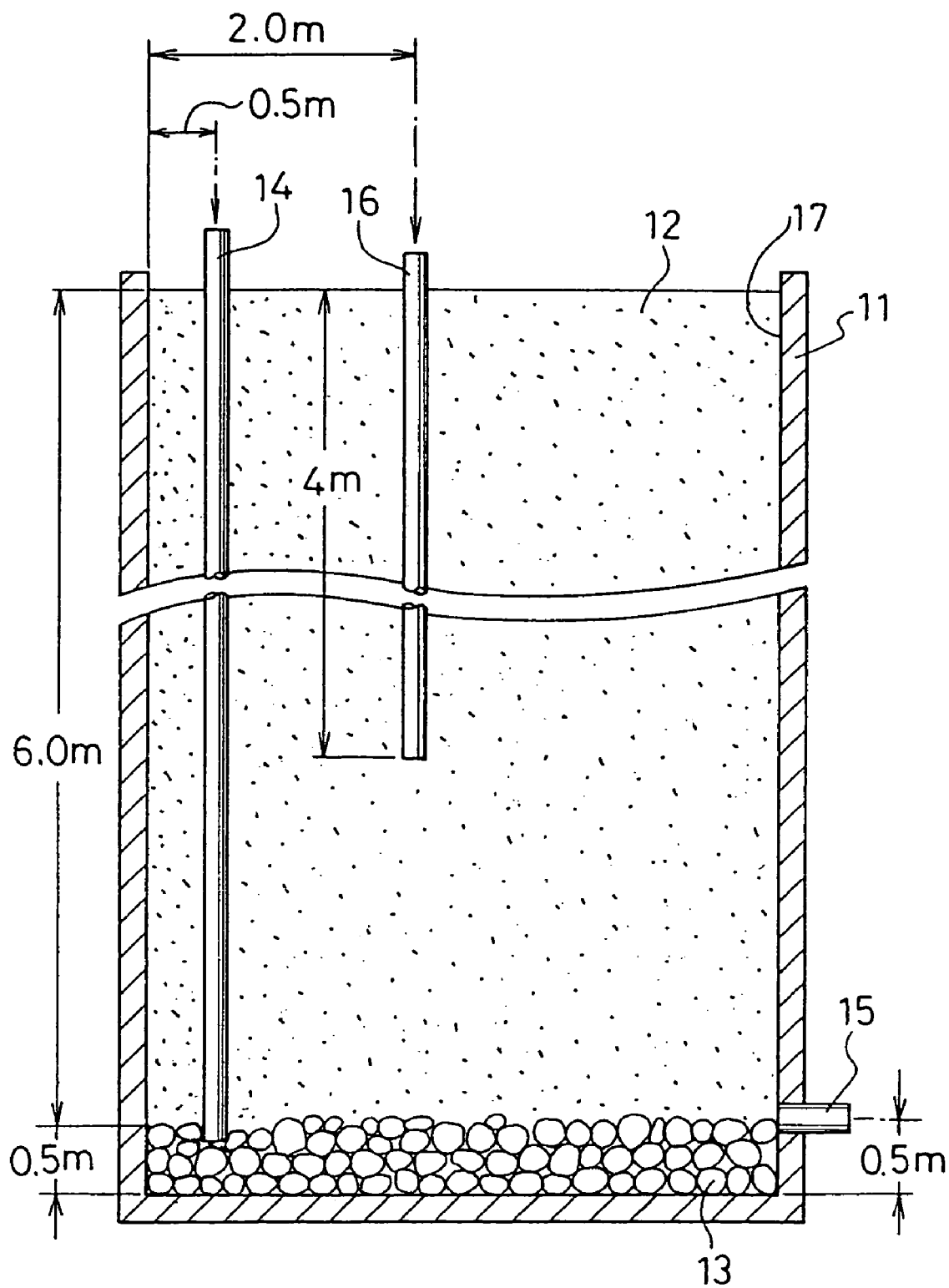
FIG. 2 is a sectional view showing the structure of an artificial groundwater experiment facility used in Example 2 according to the present invention.

FIG. 2 is a sectional view showing an artificial groundwater experiment facility used for effecting a groundwater experiment in the method of decreasing nitrate nitrogen and volatile organic compounds in Example 2.

As shown in FIG. 2, in the artificial groundwater experiment facility used in Example 2, experiment soil 12 mixed with an experiment material and a gravel layer 13 were placed in an experiment bath 17 formed with a concrete block frame 11, before experiment. In the experiment bath 17 surrounded by the concrete block frame 11 in the artificial groundwater experiment facility, the ground surface area of the experiment soil 12 was 18 m², and the soil depth was 6.0 m. Under this experiment soil 12, a gravel layer 13 is formed at a thickness of 50 cm. A mixture of kuroboku soil and loam at a ratio of about 6:4 was used as the experiment soil 12.

In the experiment bath 17, an artificial well 14 constituted of a vinyl chloride tube having a diameter of 20 cm is provided. This artificial well 14 is provided at a position 0.5 m from the inner wall surface at one end of the experiment bath 17 (this inner wall surface is standard position) and has a depth of about 6 m, and reaches to the gravel layer 13. Further, a nitrate nitrogen solution addition piper 16 for adding a nitrate nitrogen solution is buried at a position 2 m from the inner wall surface (standard position) of the experiment bath 17 in the artificial groundwater experiment facility, extending to a position 4 m depth from the ground surface. A measurement water incorporating port 15 communicating to outside is provided on another inner wall surface opposite to the standard surface, one inner wall surface. This measurement water incorporating port 15 is formed at a position 50 cm from the bottom (corresponding to the uppermost part of the gravel layer 13), and provided for sampling measurement water which is groundwater.

The following experiments were conducted in 12 compartments using the artificial soil experiment facility constituted as described above.

In each experiment bath 17, a nitrate nitrogen solution of which nitrate nitrogen concentration had been previously controlled to 40 mg/L was added continuously from the end of the nitrate nitrogen solution adding pipe 16 (position 4 m from the ground surface) at a rate of 12 mL/day using a metering pump.

Under the above-mentioned conditions, movement of artificial groundwater is estimated to about 6.5 m/year. The present inventors have added 800 g of each hydrogen donor from the artificial well 14 in each test district and each comparative district. 30 days after initiation of the test, water was sampled from the measurement water incorporating port 15 formed at a position 50 cm from the bottom (corresponding to the uppermost part of gravel layer), and analyses of the nitrate nitrogen concentration, ammonia nitrogen concentration and total carbon concentration of the collected water were conducted according to JIS methods.

The experiment results are shown in Table 2 for each test district and each comparative district.

TABLE 2

| | Compartment No. | Experiment materials | Nitrate nitrogen concentration (mg/L) after 30 days | Ammonia nitrogen concentration (mg/L) after 30 days | Whole carbon concentration (mg/L) after 30 days |
|---|---|---|---|---|---|
| Experiment district | 1 | Myristilate | 9 | 0.5 | 8 |
| | 2 | Stearyl alcohol | 4 | 0.9 | 9 |
| | 3 | Myristyl myristate | 5 | 0.6 | 8 |
| | 4 | Sorbitan monopalmitate | 5 | 0.5 | 7 |
| | 5 | Tetraglyceryl pentastearate | 8 | 0.5 | 10 |
| | 6 | Coconut oil fatty acid | 6 | 0.8 | 7 |
| | 7 | Tetraglyceryl pentastearate + iron powder: 1 wt % | 3 | 0.9 | 7 |
| Comparative district | 8 | Cellulose powder | 31 | 0.6 | 12 |
| | 9 | Syrup | 18 | 0.8 | 44 |
| | 10 | Soy bean oil | 9 | 0.5 | 41 |
| | 11 | Natural bark fermentation material | 28 | 6.3 | 20 |
| | 12 | Control (no addition) | 32 | 0.4 | 6 |

As shown in Table 2, in compartment Nos. 1 to 6 in the test district, myristilate, stearyl alcohol, myristyl myristate, sorbitan monopalmitate, tetraglyceryl pentastearate, coconut oil fatty acid were used, respectively, as experiment materials. In compartment No. 7 in the test district, tetraglyceryl pentastearate and an iron powder having an average particle size of about 65 μm were mixed in amount of 1 wt % based on soil.

As the comparative materials in compartment Nos. 8 to 11 in the comparative district, a cellulose powder, syrup, soy bean oil and natural bark fermentation material were mixed in soil and used. In compartment No. 12 in the comparative district, no material was mixed and soil was solely used.

As apparent from Table 2, water from soil (test district) according to the method of decreasing nitrate nitrogen and volatile organic compounds of the present invention has a nitrate nitrogen concentration lowered significantly as compared with water from compartments of conventional technologies and the compartment composed only of soil (compartment No. 12 in Table 2) shown as the comparative district, and it can be understood that a denitrification reaction occurs effectively in groundwater.

In the case of coexistence of an iron powder (compartment No. 7), since reducing property is improved, a denitrification reaction is further promoted.

Further, water obtained according to the method of decreasing nitrate nitrogen and volatile organic compounds of the present invention has a total carbon concentration in groundwater is extremely small as compared with water obtained by conventional technologies shown as the comparative district. Therefore, secondary pollution by organic matter can be prevented effectively, and as is known from the results of the ammonia nitrogen concentration, a nitrogen releasing source as found in natural bark fermentation materials of conventional technologies is not obtained.

It is known from above-mentioned experiment results that the method of decreasing nitrate nitrogen and volatile organic compounds of the present invention can be applied of course to soil itself, and also has an excellent effect that leakage of nitrate nitrogen into groundwater passing through the soil can be decreased and secondary pollution by organic compounds can be prevented.

Example 3

Figure 3:
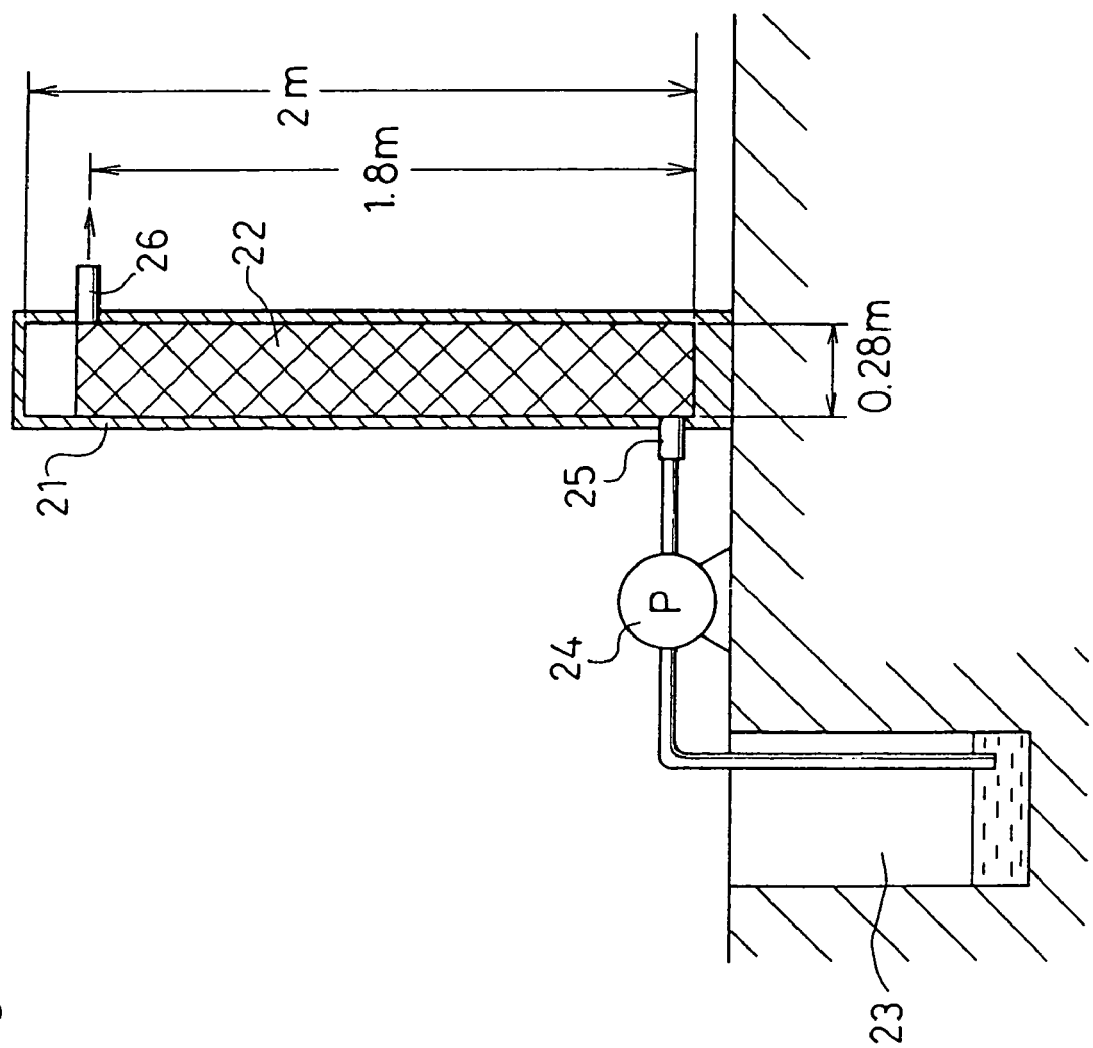
FIG. 3 is a view showing the structure of a column experiment apparatus used in Example 3 according to the present invention.

FIG. 3 is a view showing the structure of a column experiment apparatus used for effecting the method of decreasing nitrate nitrogen and volatile organic compounds in Example 3. Here, the column is a vessel having a function of decreasing nitrate nitrogen and volatile organic compounds, and decreases nitrate nitrogen and volatile organic compounds by allowing groundwater such as well water and the like to pass. In Example 3, a resin column having a diameter of 28 cm and a height of 2 m was used.

As shown in FIG. 3, an experiment material 22 is filled in the column 21. Well water evacuated from a well 23 by a pump 24 flow into this column 21 through an introduction port 25 of the column 21. It is so constituted that well water which comes into with the experiment material 22 while rising in the column 21, is discharged from an outflow port 26 formed at the upper part of the column 21.

Column experiments were conducted as described below using the column experiment apparatus constituted as described above.

From already-provided well polluted with nitrate nitrogen (nitrate nitrogen concentration: 14 mg/L), well water was evacuated by a pump 24 and allowed to flow into the column 21. In Example 3, six resin columns having a diameter of 28 cm and a height of 2 m were used, and experiments were conducted on 12 kinds of experiment materials using the resin columns each twice.

In the examples, experiment materials of the present invention such as fatty acids and alcohols were filled in columns (column Nos. 1 to 8) and comparative materials of conventional technologies were filled in columns (column Nos. 9 to 12) for comparison, and the evacuated groundwater was passed through them. In these experiments, substantial filling heights of the experiment materials in the columns were all 1.8 m. The passing time of groundwater in the column was 5.5 hours, and the average environment temperature during the experiment period was 21° C.

The nitrate nitrogen concentration, ammonia nitrogen concentration and total carbon concentration of the well water after passing through the column 30 days after initiation of passing of well water which is experiment initiation were measured. The measurement results are summarized in Table 3.

TABLE 3

| | Column No. | Experiment materials | Nitrate nitrogen concentration (mg/L) after 30 days | Ammonia nitrogen concentration (mg/L) after 30 days | Whole carbon concentration (mg/L) after 30 days |
|---|---|---|---|---|---|
| Experiment district | 1 | Behenic acid | 1.8 | 0.02 | 5 |
| | 2 | Myristyl alcohol | 2.5 | 0.04 | 7 |
| | 3 | Methyl stearate | 1.4 | 0.04 | 6 |
| | 4 | Sorbitan monomyristate | 1.6 | 0.02 or less | 5 |
| | 5 | Oleic stearic monodiglyceride | 1.9 | 0.05 | 4 |
| | 6 | Beef tallow fatty acid | 2.1 | 0.07 | 6 |
| | 7 | Myristyl alcohol + aluminum powder: 1 wt % | 0.8 | 0.05 | 5 |
| | 8 | Beef tallow fatty acid + iron powder: 1 wt % | 0.5 | 0.7 | 5 |
| Comparative district | 9 | Cellulose powder | 13.0 | 0.04 | 4 |
| | 10 | Sucrose | 15.0 | 0.05 | 41 |
| | 11 | Cellulose powder impregnated with corn oil (corresponding to 1.2 g of net corn oil) | 1.8 | 0.06 | 62 |
| | 12 | Natural bark fermentation material | 6.0 | 9.40 | 13 |

As shown in Table 3, in column Nos. 1 to 6 in the test district, behenic acid, myristyl alcohol, methyl stearate, sorbitan monomyristate, oleic stearic monodiglyceride, beef tallow fatty acid were used, respectively, as experiment materials. In column No. 7 in the test district, myristyl alcohol and an aluminum powder having an average particle size of 10 μm were mixed in amount of 1 wt % based on soil. In column No. 8 in the test district, beef tallow fatty acid and an iron powder having an average particle size of 15 μm were mixed in amount of 1 wt % based on soil.

As the comparative materials in the comparative district, a cellulose powder (column No. 9), sucrose (column No. 10), cellulose powder impregnated with corn oil (corresponding to 1.2 kg of net corn oil) (column No. 11), and natural bark fermentation material (column No. 12) were mixed in soil.

As apparent from Table 3, the results in the test district according to the method of decreasing nitrate nitrogen and volatile organic compounds of the present invention shows a nitrate nitrogen concentration lowered significantly as compared with results of conventional technologies shown as the comparative district, and it can be understood that a denitrification reaction occurs effectively in passing through a column in the test district.

Further, the method of decreasing nitrate nitrogen and volatile organic compounds in soil and groundwater of the present invention shows a total carbon concentration smaller significantly as compared with conventional technologies shown as the comparative district, and secondary pollution into treatment water by organic matter can be effectively prevented.

Example 4

FIG. 4 is a view showing an experiment facility used for effecting the method of decreasing nitrate nitrogen and volatile organic compounds in Example 4. A part (a) of FIG. 4 is a plan view of the experiment facility, and a part (b) of FIG. 4 is a side view thereof.

As shown in FIG. 4, polluted soil 32 and experiment soil 33 are accommodated in an experiment bath 34 formed by a concrete frame in the form of square measure. As shown in the part (a) of FIG. 4, the polluted soil 32 is provided approximately at the center of the experiment bath 34 so that it is surrounded by the experiment soil 33.

In Example 4, the concrete frame 31 in the form of square measure is a cube of 1 m square having open upper part, and artificial soil prepared by mixing kuroboku soil and loam in equivalent amounts was charged in the experiment bath 34 formed with the concrete frame 31 and allowed to stand outdoors (average temperature: 21° C.) for about 2 months.

Then, the surface of the artificial soil formed as described above was dug to form a hole in the form of cylinder having a diameter of 30 cm and a depth of 50 cm, and this hole was re-buried with the polluted soil 32.

The polluted soil was obtained by adding experiment materials (containing no nitrogen atom) such as fatty acids and alcohols of the present invention and comparative materials of conventional technologies used for comparison in an amount of 1 wt % to 1.2 ton of soil polluted with 1,1,1-trichloroethane and 1,1-dichloroethylene (containing about 1400 μg/L of 1,1,1-trichloroethylene, about 50 μg/L of 1,1-dichloroethylene, by elution test according to Kankoku No. 46), and mixing kuroboku soil and loam in equivalent amounts uniformly.

To the polluted soil formed as described above was fed diammonium hydrogen phosphate having a concentration of 100 mg/L as a nutrient salt (nitrogen source) at a ratio of 140 L/day.

Under the above-mentioned conditions, the concentrations of 1,1,1-trichloroethane and 1,1-dichloroethylene in the polluted soil 32 were measured by gas chromatograph mass spectrometry 20 days after initiation of the experiment. Soils around the re-buried polluted soil 32 (soils on four corners A to D at a depth of 50 cm in FIG. 4) were sampled, and four-point average values of the total carbon concentration and total nitrogen concentration per soil dried weight were measured. These experiment results are summarized in Table 4.

TABLE 4

| | Compartment No. | Experiment materials | 1,1,1-trichloroethane concentration (μg/L) after 20 days | 1,1-dichloroethylene concentration (μg/L) after 20 days | whole carbon concentration (mg/L) of surrounding soil after 20 days | Whole nitrogen concentration (mg/L) of surrounding soil after 20 days |
|---|---|---|---|---|---|---|
| Experiment district | 1 | Stearic acid | 820 | 24 | 5 | 0.8 |
| | 2 | Behenyl alcohol | 920 | 21 | 3 | 1.0 |
| | 3 | Cholesterol stearate | 650 | 20 | 6 | 0.7 |
| | 4 | Polyoxyethylene octylphenyl ether | 820 | 24 | 5 | 0.8 |
| | 5 | Oleic monoglyceride | 700 | 19 | 9 | 0.9 |
| | 6 | Beef tallow fatty acid | 730 | 18 | 5 | 1.0 |
| | 7 | Aromatic polyester resin (ε-capro-1 actone polymer) | 810 | 22 | 6 | 1.1 |
| Comparative district | 8 | Cellulose powder | 1310 | 41 | 6 | 0.8 |
| | 9 | Caprylic | 960 | 16 | 29 | 1.0 |

TABLE 4-continued

| Compartment No. | Experiment materials | 1,1,1-trichloroethane concentration (μg/L) after 20 days | 1,1-dichloroethylene concentration (μg/L) after 20 days | whole carbon concentration (mg/L) of surrounding soil after 20 days | Whole nitrogen concentration (mg/L) of surrounding soil after 20 days |
|---|---|---|---|---|---|
| | acid | | | | |
| 10 | Oleic acid | 690 | 21 | 25 | 1.0 |
| 11 | Lactic acid | 870 | 20 | 19 | 8.0 |
| 12 | Ethanol | 1100 | 19 | 31 | 0.9 |
| 13 | Control (no addition of organic substance) | 1380 | 47 | 4 | 0.9 |

As shown in Table 4, in compartment Nos. 1 to 7 in the test district, stearic acid, behenyl alcohol, cholestrol stearate, polyoxyethylene octylphenyl ether, oleic monoglyceride, beef tallow fatty acid and aromatic polyester resin (ε-caprolactone polymer) were used, respectively, as experiment materials.

As the comparative materials of compartment Nos. 8 to 12 in the comparative district, a cellulose powder, caprylic acid, oleic acid, lactic acid and ethanol are mixed in soil and used. In compartment No. 13 in the comparative district, no substance was mixed and only soil was used.

As shown in Table 4, the results in the test district using a decreasing agent of the present invention showed decreases in 1,1,1-trichloroethane and 1,1-dichloroethylene as compared with soil (compartment No. 13) containing no soil and organic matter using comparative materials of conventional technologies shown as the comparative district. Oleic acid in compartment No. 10 in the comparative district is an unsaturated fatty acid, and has low concentrations of 1,1,1-trichloroethane and 1,1-dichloroethylene, however, has high water-solubility. Therefore, there is a problem of secondary pollution by easy diffuse of the oleic acid in soil.

The total carbon concentration in soils around the polluted soil 32 was lower, in the case of soil using a decreasing agent such as a fatty acid or alcohol and the like used in the present invention, as compared with the case of use of organic matter of conventional technologies.

In Example 4, since an experiment material containing no nitrogen atom is used, diammonium hydrogen phosphate is fed into soil. Therefore, in all test districts, nitrogen was detected in soils around the polluted soil 32.

From this result, it is known that, according to the method of decreasing nitrate nitrogen and volatile organic compounds of the present invention, diffusion of organic matter into surrounding soils and leakage thereof are suppressed to the minimum extents, and effective prevention of secondary pollution by organic matter is possible while maintaining a high volatile organic compound removal ability.

Example 5

In the method of decreasing nitrate nitrogen and volatile organic compounds in Example 5, the same experiment facility (FIG. 4) as in Example 4 was used. Stearic acid was used as the decreasing agent such as fatty acids, alcohols and the like used in the present invention, and an iron powder having an average particle size of about 15 μm was added simultaneously with this stearic acid, to give polluted soil of compartment No. 1. In polluted soil of compartment No. 2, stearic acid and an aluminum powder having an average particle size of 180 μm were added in the same concentration as the polluted soil of compartment No. 1. The same experiment as in Example 4 was conducted on these polluted soils (compartment Nos. 1, 2).

The results of these experiments are shown in Table 5.

TABLE 5

| Compartment No. | Experiment materials | 1,1,1-trichloroethane concentration (μg/L) after 20 days | 1,1-dichloroethylene concentration (μg/L) after 20 days | whole carbon concentration (mg/L) of surrounding soil after 20 days | Whole nitrogen concentration (mg/L) of surrounding soil after 20 days |
|---|---|---|---|---|---|
| 1 | Stearic acid + iron powder, 1 wt % | 530 | 12 | 6 | 0.8 |
| 2 | Stearic acid + aluminum powder, 1 wt % | 680 | 14 | 5 | 0.8 |

As shown in Table 5, in any test district of compartment Nos. 1, 2, improvement in removal ratio of a volatile organic compound was observed as compared with Example 4, by reducing actions of the iron powder and aluminum powder.

Example 6

In the method of decreasing nitrate nitrogen and volatile organic compounds in Example 6, the same experiment facility (FIG. 4) as in Example 4 was used. Beef tallow fatty acid was used as the decreasing agent such as fatty acids, alcohols and the like used in the present invention, and a bacteria previously cultured was inoculated to the soil and the same experiment as in Example 4 was conducted.

For obtaining the bacteria used in Example 6, 1,1,1-trichloroethane was controlled to 5000 μg/L, 1,1-dichloroethylene was controlled to 5000 μg/L, diammonium hydrogen phosphate was controlled to 800 mg/L and beef tallow fatty acid which was only carbon source was controlled to 0.5 wt % in soil collected at a point of 30 cm depth from the ground surface of agricultural land (tea field), and the medium was cultured at a temperature of 16° C. for 12 days.

The experiment results in Example 6 are shown in Table 6.

Example 7

In the method of decreasing nitrate nitrogen and volatile organic compounds in Example 7, the same experiment facility (FIG. 4) as in Example 4 was used. The same experiment as in Example 4 was conducted using the following substance group containing a nitrogen atom as the decreasing agent such as fatty acids, alcohols and the like used in the present invention.

In compartment Nos. 1 to 5 in the test district, myristylamine, distearylamine, steatylamine acetate, stearic amide, distearyl ketone were used, respectively, as experiment materials containing a nitrogen atom. In compartment Nos. 6 and 7 as the comparative district, methanol and acetic acid were used, respectively, as experiment materials, and in compartment No. 8, no organic substance was added. In compartment No. 7, a nutrient salt (nitrogen source) was not added to soil of the comparative district. The experiments results of Example 7 are summarized in Table 7.

TABLE 6

| Compartment No. | Experiment materials | 1,1,1-trichloroethane concentration (μg/L) after 20 days | 1,1-dichloroethylene concentration (μg/L) after 20 days | whole carbon concentration (mg/L) of surrounding soil after 20 days | Whole nitrogen concentration (mg/L) of surrounding soil after 20 days |
|---|---|---|---|---|---|
| 1 | Beef tallow fatty acid + bacterium | 410 | 8 | 9 | 0.7 |

As shown in Table 6, in Example 6, addition of a bacteria acted effectively, and improvement in removal ratio of a volatile organic compound was observed as compared with Example 4.

TABLE 7

| | Compartment No. | Experiment materials | 1,1,1-trichloroethane concentration (μg/L) after 20 days | 1,1-dichloroethylene concentration (μg/L) after 20 days | whole carbon concentration (mg/L) of surrounding soil after 20 days | Whole nitrogen concentration (mg/L) of surrounding soil after 20 days |
|---|---|---|---|---|---|---|
| Experiment district | 1 | Myristylamine | 940 | 29 | 4 | 0.4 |
| | 2 | Distearylamine | 910 | 24 | 5 | 0.2 |
| | 3 | Stearylamine acetate | 900 | 28 | 8 | 0.2 |
| | 4 | Stearic amide | 790 | 24 | 6 | 0.3 |
| | 5 | Distearyl ketone | 830 | 20 | 5 | 0.2 |
| Comparative district | 6 | Methanol | 1330 | 49 | 33 | 0.2 or less |
| | 7 | Acetic acid | 1350 | 41 | 28 | 0.5 |
| | 8 | Control (no addition of organic substance) | 1350 | 46 | 5 | 0.2 |

As shown in Table 7, in any polluted soil in the comparative district, decrease in 1,1,1-trichloroethane and 1,1-dichloroethylene was not found due to lack of nutrient salts. However, in the polluted soil in the test district in Example 7, more effective decrease was manifested by the substance group containing a nitrogen atom.

Regarding the organic substance concentration (total carbon concentration) and the total nitrogen concentration in soils around the polluted soil, those in the test district using a substance group containing a nitrogen atom in Example 7 showed lower value as compared with the comparative district using organic matter of conventional technologies. Since a nutrient salt containing nitrogen was not added, the total nitrogen concentration was minute in all compartments. Though phosphorus was not particularly added in the present example, the object could be accomplished by using a phosphorus component present in soil.

As apparent from the experiment results shown in Table 7, by using the substance group containing a nitrogen atom in Example 7, a hydrogen donor and a nitrogen source can be simultaneously added in the form of solid. Therefore, there is no necessity, to add a water-soluble substance, and not only secondary pollution with organic matter but also secondary pollution with nitrogen can be effectively decreased.

Example 8

In the method of decreasing nitrate nitrogen and volatile organic compounds in Example 8, an experiment was conducted using a well provided in soil polluted with tetrachloroethylene.

It had been known by previous investigation that about 125 m$^2$ of the surface of soil was polluted, and a water-containing layer at a position 6 m below the ground surface was polluted. In this water-containing layer, the tetrachloroethylene concentration was about 0.25 mg/L.

30 kg of stearylamine was gradually added over 6 days through a well in the polluted soil, and the tetrachloroethylene concentration, total carbon concentration and total nitrogen concentration after 90 days were analyzed from water collected from the well.

As a result, after 90 days, the tetrachloroethylene concentration decreased to 0.08 mg/L, increase in the total carbon concentration based on the initial value was as small as 0.2 mg/L, and the total nitrogen concentration was below the detection limit.

Stearylamine used in Example 8 is one example of decreasing agents of the present invention, and it is needless to say that the decreasing agents used in the test district in the above-mentioned examples can be used. In this case, selection of the decreasing agent addition amount thereof are determined in view of various conditions such as environment and cost of the intended soil, and can be varied within the ranges in which the main purpose of the invention is not deteriorated.

In Example 8, uniform mixing into soil is exemplified as the method of adding a decreasing agent of the present invention into soil, however, the present invention is not restricted to such embodiment. For example, there can also be used a method in which a wall band formed by aggregating at high density a substance group of a decreasing agent of the present invention is placed along a direction vertical to the flow of groundwater, and a method in which such wall band is placed along a direction vertical to permeation direction of rain water and the like. It is needless to say that various layouts causing such contact are included in the present invention since the invention comprising contacting a substance group of a certain decreasing agent to water containing nitrate nitrogen.

As described above, the present invention has the flowing effects as disclosed by detailed descriptions in the examples.

The method of decreasing nitrate nitrogen and volatile organic compounds in soil and groundwater of the present invention performs excellent effects that on site treatment is possible without requiring evacuation of water and movement of water to other position, a high biological denitrification ability and an ability of decreasing a volatile organic compound are provided, and secondary pollution by discharge of organic matter and nitrogen into environment is extremely small.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method of decreasing nitrate nitrogen and volatile organic compounds in soil, comprising burying alcohol having 12 or more carbon atoms in said soil wherein a microorganism in said soil reduces at least one of nitrate nitrogen and volatile organic compounds under anaerobic conditions using said alcohol as a hydrogen donor for said microorganism.

2. The method of decreasing nitrate nitrogen and volatile organic compounds in soil according to claim 1, wherein the alcohol is a saturated alcohol.

3. A method of decreasing nitrate nitrogen and volatile organic compounds in groundwater, comprising contacting said groundwater containing at least one of nitrate nitrogen and volatile organic compounds on site with an alcohol having at least 12 carbon atoms wherein a microorganism in said groundwater reduces at least one of nitrate nitrogen and volatile organic compounds under anaerobic conditions using said alcohol as a hydrogen donor for said microorganism.

4. The method of decreasing nitrate nitrogen and volatile organic compounds in groundwater according to claim 3, wherein the alcohol is a saturated alcohol.

* * * * *

UNITED STATES PATENT AND TRADEMARK OFFICE
CERTIFICATE OF CORRECTION

PATENT NO.        : 7,030,287 B2  Page 1 of 1
APPLICATION NO. : 11/101081
DATED              : April 18, 2006
INVENTOR(S)      : Koichiro Murasawa, Hitoshi Komoda and Masaru Makino It is certified that error appears in the above-identified patent and that said Letters Patent is hereby corrected as shown below:

Front page of Letters Patent
Item (75) Inventors: Koichiro Murasawa, Kawanishi (JP)
                              Hitoshi Komoda, Kaga (JP)
                              Masaru Makino, Kaga (JP)

Signed and Sealed this

Twenty-second Day of August, 2006

JON W. DUDAS
*Director of the United States Patent and Trademark Office*